(12) United States Patent
Nakamura

(10) Patent No.: US 6,278,507 B1
(45) Date of Patent: Aug. 21, 2001

(54) REFLECTION TYPE LIQUID CRYSTAL DISPLAY DEVICE

(75) Inventor: Kozo Nakamura, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/087,150

(22) Filed: May 29, 1998

(30) Foreign Application Priority Data

Jun. 6, 1997 (JP) .................................................... 9-148760
Mar. 10, 1998 (JP) .................................................. 10-057281
Mar. 10, 1998 (JP) .................................................. 10-057282

(51) Int. Cl.$^7$ ............................ G02F 1/1335; G02F 9/00; G02B 5/22

(52) U.S. Cl. ............................... 349/106; 349/113; 430/7; 359/891

(58) Field of Search ................................... 349/106, 113, 349/115; 430/7; 359/502, 891

(56) References Cited

U.S. PATENT DOCUMENTS 5,587,818 * 12/1996 Lee ........................................ 349/106
5,671,031   9/1997 Nakamura et al. ................... 349/106
5,694,186 * 12/1997 Yanagawa et al. ................... 349/106

FOREIGN PATENT DOCUMENTS 9-211448   8/1997 (JP) .

* cited by examiner

*Primary Examiner*—Toan Ton
(74) *Attorney, Agent, or Firm*—Nixon & Vanderhye P.C.

(57) ABSTRACT

The reflection type liquid crystal display device of this invention includes a pair of substrates opposing each other with a liquid crystal layer therebetween, a reflection electrode being formed on one of the substrates, a light-transmissive counter electrode and color filters of three colors of red, green, and blue being formed on the other substrate, wherein the red color filter transmits light of which chromaticity coordinates (x, y) in an XYZ color system chromaticity diagram satisfy expressions $0.37 \leq x \leq 0.43$ and $0.28 \leq y \leq 0.32$ under a condition of a 2° field of view using a $D_{65}$ light source.

8 Claims, 13 Drawing Sheets

FIG. 7
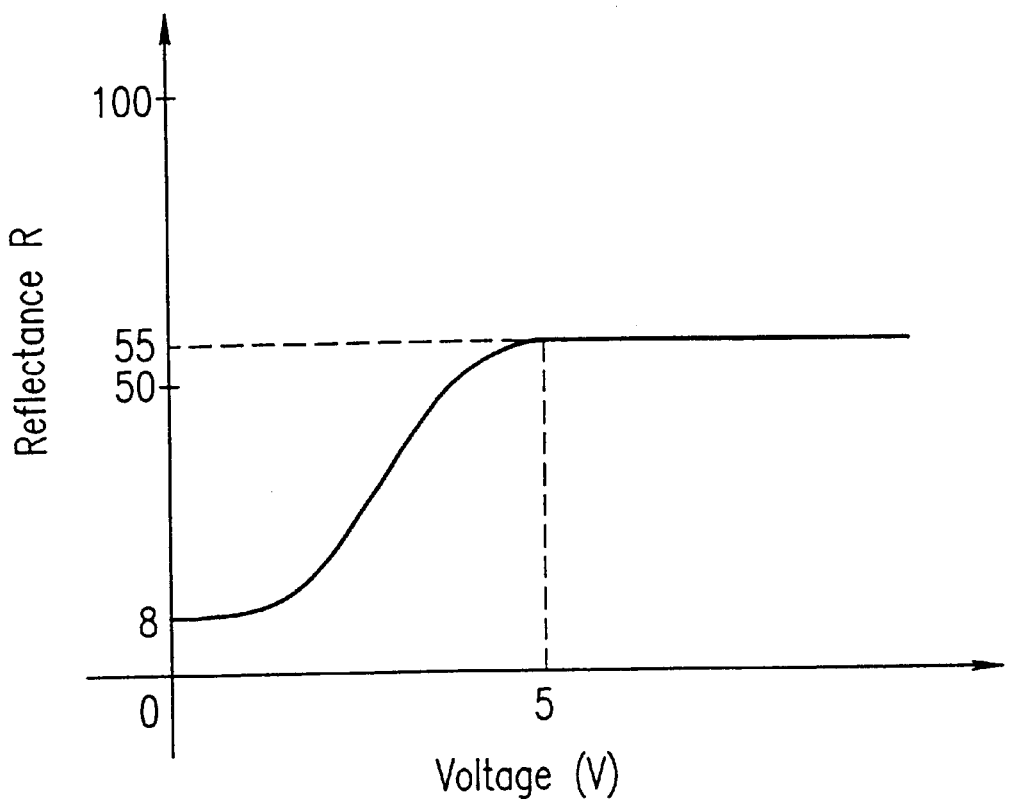
FIG. 8    Spectral distribution of reference light D65
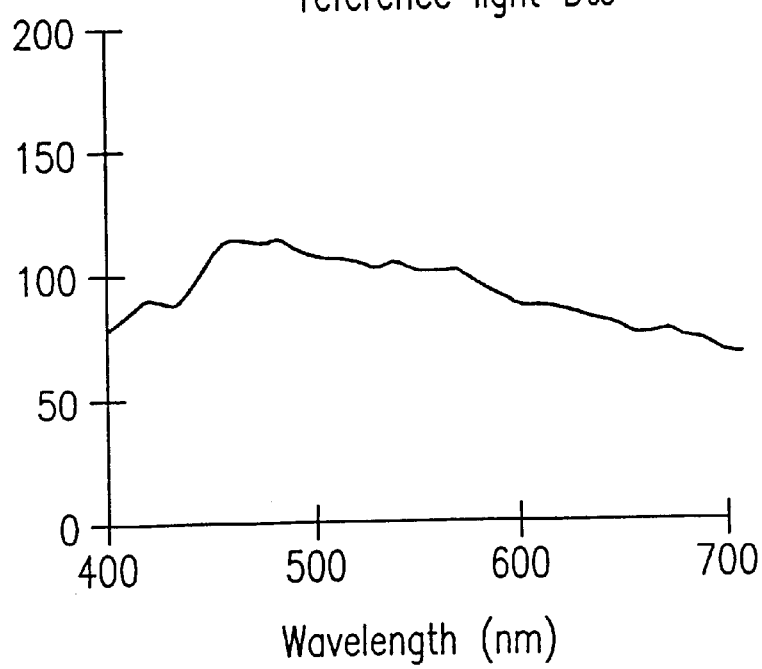

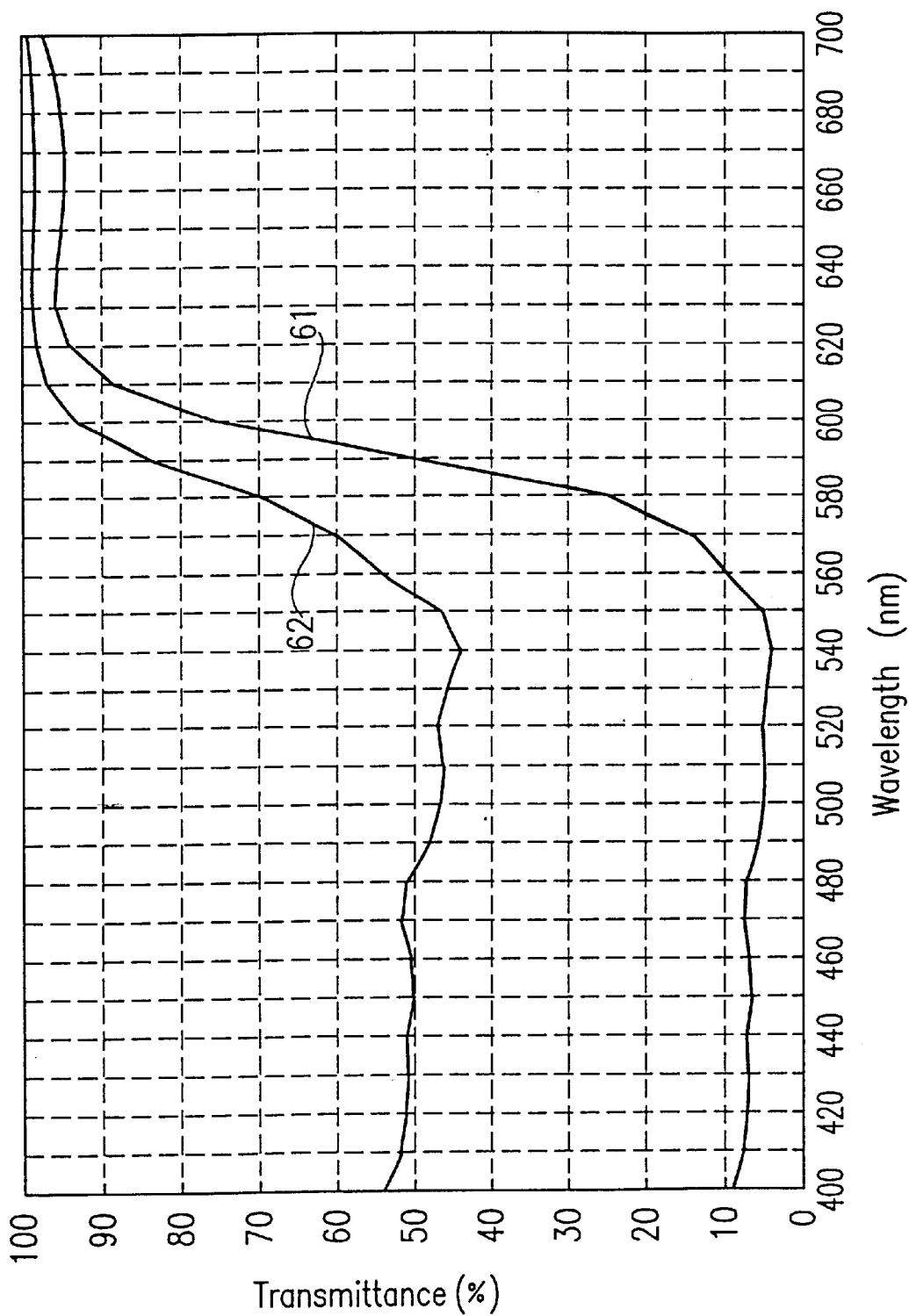

REFLECTION TYPE LIQUID CRYSTAL DISPLAY DEVICE

BACKGROUND OF THE INVENTION

1. Field of the Invention

The present invention relates to a small-size reflection type liquid crystal display device with low power consumption. More particularly, the present invention relates to a reflection type liquid crystal display device capable of providing a bright color display, and a reflection type liquid crystal display device provided with an auxiliary light system.

2. Description of the Related Art

Conventionally, liquid crystal display devices have been used as displays for information terminals. Such liquid crystal display devices are categorized into two types: a transmission type liquid crystal display device capable of providing a bright display by using a backlight system as a light source; and a reflection type liquid crystal display device providing a display by reflecting ambient light without the use of a backlight system as a light source.

Although realizing bright display, the transmission type liquid crystal display device is heavy and consumes a large amount of power since it includes the backlight. In contrast, the reflection type liquid crystal display device, which does not require a backlight, is light in weight and consumes only a small amount of power. With such advantages, the reflection type liquid crystal display devices are especially useful as displays for portable information terminals.

Conventionally, as the reflection type liquid crystal display devices, those which provide a monochrome display in the twisted nematic (TN) mode, the super-twisted nematic (STN) mode, and the like have been put into practical use. For realizing color display, the reflection type liquid crystal display device provided with RGB color micro-filters for each pixel has been developed.

The color reflection type liquid crystal display devices may be realized, not only by using a color filter, but also by utilizing light interference due to the birefringence effect of the liquid crystal, or by utilizing multi-interference between multi-layer films. However, in the former method utilizing light interference, since the retardation varies depending on the temperature and the angle of vision, the color hue itself may vary. In such a case, even black and white display is difficult. The latter method utilizing multi-interference is disadvantages in cost and production efficiency compared with the method using a color filter.

In general, in a reflection type liquid crystal display device provided with a color filter, ambient light passes through the color filter twice. When the same color filter used for a transmission type liquid crystal display device is used for the reflection type liquid crystal display device, there is an extreme decrease in the light transmittance, resulting in a dark display. To avoid this problem, a color filter with a high light transmittance should be used for the reflection type liquid crystal display device.

As a specific example, FIG. 10 shows the wavelength versus transmittance characteristics of red color filters used for the transmission type and reflection type liquid crystal display devices as curves 61 and 62, respectively.

As is observed from FIG. 10, while the red color filter used for the transmission type liquid crystal display device effectively absorbs light within the wavelength range of 580 nm or less, the red color filter used for the reflection type liquid crystal display device has a transmittance higher than that for the transmission type liquid crystal display device for light within the wavelength range of 580 nm or less.

In such a conventional color filter used for the reflection type liquid crystal display device, in order to secure the brightness, the light transmittance of the color filter for the wavelength range of 580 nm or less was merely increased. Actually, increasing the light transmittance causes a minute change in color hue. This change in color hue occurs in any of red, green, and blue color filters: Red changes toward orange, green changes toward yellowish green, and blue changes toward cyan. A white display obtained by the additive color mixture among red, green, and blue also changes to a yellow or bluish display. The change of red toward orange particularly reduces the visibility.

In full-color display, the color balance is lost as the color hues of red, green, and blue change. Therefore, fore, a desired display color cannot be reproduced, resulting in reducing the display quality.

The reason why the color hue changes will be described, taking the red color filter as an example.

In a red color filter having the characteristics represented by the curve 62 in FIG. 10, in order to increase the light transmittance, the transmittances for light in the green wavelength range (around 540 nm) and the blue wavelength range (around 450 nm) have been increased substantially equally. Accordingly, the color hue is slightly shifted toward green and blue. The shift toward blue hardly causes a problem. However, the shift toward green causes red to be recognized as yellowish red. As a result, a color hue shifted toward orange is recognized.

The change in color hue described above is especially observed in red and white.

Another problem is that, as the light transmittance of the color filter is made higher, the color purity becomes lower, resulting in a pale display as a whole and thus a reduced chroma. Accordingly, the light transmittance of the color filter must be selected in consideration of the color purity.

In reflection type liquid crystal display devices for mainly displaying characters and diagrams, such as a portable personal computer, a wordprocessor, a game machine, and the like, the brightness of the display is sometimes regarded more important than in devices for displaying natural images. In such a case, the optimization of the brightness and the chroma (color purity) is different from that performed for the devices for displaying natural images. That is, in such a case, it is desirable to obtain a brighter display even though the chroma is reduced to the extent where the display color is barely recognizable.

In recent years, a new reflection type liquid crystal display device has been developed, which functions as the normal reflection type under the environment where ambient light is prevalent, such as outdoors and near a window indoors, but uses an auxiliary light to supplement reduced brightness of ambient light under the environment where the amount of ambient light is reduced.

In such a reflection type liquid crystal display device, the chroma can be improved by lighting the auxiliary light compared with the conventional reflection type liquid crystal display device.

However, the auxiliary light only supplies an amount of light sufficient enough to supplement the shortage of ambient light, not emitting intense light as is done by a backlight of the transmission type liquid crystal display device. Accordingly, the brightness is considerably reduced if a color filter with a high color purity (such as the color filter used for the transmission type liquid crystal display device) is used for the reflection type liquid crystal display device provided with the auxiliary light.

SUMMARY OF THE INVENTION

The reflection type liquid crystal display device of this invention includes a pair of substrates opposing each other with a liquid crystal layer therebetween, a reflection electrode being formed on one of the substrates, a light-transmissive counter electrode and color filters of three colors of red, green, and blue being formed on the other substrate, wherein the red color filter transmits light of which chromaticity coordinates (x, y) in an XYZ color system chromaticity diagram satisfy expressions $0.37 \leq x \leq 0.43$ and $0.28 \leq y \leq 0.32$ under a condition of a 2° field of view using a $D_{65}$ light source.

In one embodiment of the invention, chromaticity coordinates (x, y) in the XYZ color system chromaticity diagram of a white color obtained by additive color mixture among the color filters satisfy expressions $0.28 \leq x \leq 0.31$ and $0.29 \leq y \leq 0.33$ under the condition of the 2° field of view using the $D_{65}$ light source.

In another embodiment of the invention, the green color filter transmits light of which chromaticity coordinates (x, y) in the XYZ color system chromaticity diagram satisfy expressions $0.29 \leq x \leq 0.33$ and $0.37 \leq y \leq 0.43$, and the blue color filter transmits light of which chromaticity coordinates (x, y) in the XYZ color system chromaticity diagram satisfy expressions $0.17 \leq x \leq 0.22$ and $x+0.04 \leq y \leq x+0.08$, under the condition of the 2° field of view using the $D_{65}$ light source.

Alternatively, the reflection type liquid crystal display device of this invention includes a pair of substrates opposing each other with a liquid crystal layer therebetween, a reflection electrode being formed on one of the substrates, a light-transmissive counter electrode and color filters of three colors of red, green, and blue being formed on the other substrate, wherein the green color filter transmits light of which chromaticity coordinates (x, y) in an XYZ color system chromaticity diagram satisfy expressions $0.29 \leq x \leq 0.33$ and $0.35 \leq y \leq 0.37$ under a condition of a 2° field of view using a $D_{65}$ light source.

In one embodiment of the invention, the red color filter transmits light of which chromaticity coordinates (x, y) in the XYZ color system chromaticity diagram satisfy expressions $0.34 \leq x \leq 0.37$ and $0.28 \leq y \leq 0.32$, and the blue color filter transmits light of which chromaticity coordinates (x, y) in the XYZ color system chromaticity diagram satisfy expressions $0.22 \leq x \leq 0.27$ and $x+0.04 \leq y \leq x+0.08$, under the condition of the 2° field of view using the $D_{65}$ light source.

In another embodiment of the invention, chromaticity coordinates (x, y) in the XYZ color system chromaticity diagram of a white color obtained by additive color mixture among the color filters of the three colors satisfy expressions $0.28 \leq x \leq 0.31$ and $0.29 \leq y \leq 0.33$ under the condition of the 2° field of view using the $D_{65}$ light source.

Alternatively, the reflection type liquid crystal display device includes: a liquid crystal panel including a pair of substrates opposing each other with a liquid crystal layer therebetween, a reflection electrode being formed on one of the substrates, a light-transmissive counter electrode and color filters of three colors of red, green, and blue being formed on the other substrate; and an auxiliary light for supplying light to a display surface of the liquid crystal panel as required, wherein the red color filter transmits light of which chromaticity coordinates (x, y) in an XYZ color system chromaticity diagram satisfy expressions $0.43 \leq x \leq 0.55$ and $0.28 \leq y \leq 0.32$, the green color filter transmits light of which chromaticity coordinates (x, y) in the XYZ color system chromaticity diagram satisfy expressions $0.29 \leq x \leq 0.33$ and $0.43 \leq y \leq 0.52$, and the blue color filter transmits light of which chromaticity coordinates (x, y) in the XYZ color system chromaticity diagram satisfy expressions $0.13 \leq x \leq 0.17$ and $x+0.04 \leq y \leq x+0.08$, under a condition of a 2° field of view using a $D_{65}$ light source.

In one embodiment of the invention, chromaticity coordinates (x, y) in the XYZ color system chromaticity diagram of a white color obtained by additive color mixture among the color filters of the three colors satisfy expressions $0.28 \leq x \leq 0.31$ and $0.29 \leq y \leq 0.33$ under the condition of the 2° field of view using the $D_{65}$ light source.

Hereinbelow, the function of the present invention with the above configuration will be described.

The reflection type liquid crystal display device according to the present invention includes a pair of substrates opposing each other with a liquid crystal layer therebetween. A reflection electrode is formed on one of the substrates, while a light-transmissive counter electrode and color filters of three colors of red, green, and blue are formed on the other substrate. The red color filter transmits light of which chromaticity coordinates (x, y) in an XYZ color system chromaticity diagram satisfy expressions $0.37 \leq x \leq 0.43$ and $0.28 \leq y \leq 0.32$ under a condition of a 2° field of view using a $D_{65}$ light source.

The red color filter which transmits light satisfying the above expressions has a low transmittance for light in the green wavelength range in order to prevent the color hue from changing, and has a high transmittance for light in the blue wavelength range in order to prevent the brightness from reducing. Thus, a red color with a good visibility can be reproduced.

In the reflection type liquid crystal display device, the green and blue color filters may be set so that the chromaticity coordinates (x, y) in the XYZ color system chromaticity diagram of the white color obtained by the additive color mixture among these color filters satisfy expressions $0.28 \leq x \leq 0.31$ and $0.29 \leq y \leq 0.33$. By this setting, a white color free from color staining can be reproduced.

The green color filter may be set to transmit light of which chromaticity coordinates (x, y) in the XYZ color system chromaticity diagram satisfy expressions $0.29 \leq x \leq 0.33$ and $0.37 \leq y \leq 0.43$, and the blue color filter may be set to transmit light of which chromaticity coordinates (x, y) in the XYZ color system chromaticity diagram satisfy expressions $0.17 \leq x \leq 0.22$ and $x+0.04 \leq y \leq x+0.08$. By this setting, changes in green and blue color hues are prevented, and the green and blue colors with a good visibility can be reproduced.

In the full-color display, in particular, the color balance will not be lost due to changes in red, green, and blue color hues, and thus desired colors can be reproduced.

Alternatively, the reflection type liquid crystal display device according to the present invention includes a pair of substrates opposing each other with a liquid crystal layer therebetween. A reflection electrode is formed on one of the substrates, while a light-transmissive counter electrode and color filters of three colors of red, green, and blue are formed on the other substrate. The green color filter transmits light of which chromaticity coordinates (x, y) in an XYZ color system chromaticity diagram satisfy expressions $0.29 \leq x \leq 0.33$ and $0.35 \leq y \leq 0.37$ under a condition of a 2° field of view using a $D_{65}$ light source.

In general, green includes more wavelength ranges with a high luminous efficacy compared with red and blue. Accordingly, a bright display which is acceptable for the display of characters and diagrams is realized without reducing the visibility of green which has the poorest contrast with white.

The red color filter may be set to transmit light which satisfies expressions $0.34 \leq x \leq 0.37$ and $0.28 \leq y \leq 0.32$, and the blue color filter may be set to transmit light which satisfies expressions $0.22 \leq x \leq 0.27$ and $x+0.04 \leq y \leq x+0.08$. By this setting, the display can be performed without reducing the visibility of yellow obtained by the additive color mixture between green and red, as well as the visibility of cyan obtained by the additive color mixture between green and blue.

The red and blue color filters may be set so that the chromaticity coordinates (x, y) in the XYZ color system chromaticity diagram of the white color obtained by the additive color mixture among the color filters of the three colors satisfy expressions $0.28 \leq x \leq 0.31$ and $0.29 \leq y \leq 0.33$. By this setting, a white color free from color staining can be obtained.

Alternatively, the reflection type liquid crystal display device according to the present invention includes: a liquid crystal panel including a pair of substrates opposing each other with a liquid crystal layer therebetween, a reflection electrode being formed on one of the substrates, a light-transmissive counter electrode and color filters of three colors of red, green, and blue being formed on the other substrate; and an auxiliary light for supplying light to a display surface of the liquid crystal panel as required. The red color filter transmits light of which chromaticity coordinates (x, y) in an XYZ color system chromaticity diagram satisfy expressions $0.43 \leq x \leq 0.55$ and $0.28 \leq y \leq 0.32$, the green color filter transmits light of which chromaticity coordinates (x, y) in the XYZ color system chromaticity diagram satisfy expressions $0.29 \leq x \leq 0.33$ and $0.43 \leq y \leq 0.52$, and the blue color filter transmits light of which chromaticity coordinates (x, y) in the XYZ color system chromaticity diagram satisfy expressions $0.13 \leq x \leq 0.17$ and $x+0.04 \leq y \leq x+0.08$.

Thus, the reflection type liquid crystal display device according to the present invention can provide a vivid display with a higher chroma (color purity) compared with the conventional device. Although the brightness is somewhat reduced compared with the conventional reflection type liquid crystal display device, a brightness which is acceptable in practical use can be secured by using an auxiliary light.

By selecting the red, green, and blue color filters so that the chromaticity coordinates (x, y) in the XYZ color system chromaticity diagram of the white color obtained by the additive color mixture among the color filters of the three colors satisfy expressions $0.28 \leq x \leq 0.31$ and $0.29 \leq y \leq 0.33$, a white display free from color staining can be provided.

Thus, the invention described herein makes possible the advantages of (1) providing a reflection type liquid crystal display device capable of reproducing a bright red color with a good visibility without causing a change in color hue, (2) providing a reflection type liquid crystal display device with a high luminous efficacy capable of providing a bright display without reducing the visibility of green which has the poorest contrast with white, and (3) providing a reflection type liquid crystal display device capable of providing a vivid display with a high chroma.

These and other advantages of the present invention will become apparent to those skilled in the art upon reading and understanding the following detailed description with reference to the accompanying figures.

BRIEF DESCRIPTION OF THE DRAWINGS

FIG. 7 is a view showing the electrooptic characteristics of a liquid crystal layer of the embodiment of the reflection type liquid crystal display device according to the present invention.

FIG. 8 is a spectral distribution diagram of a $D_{65}$ light source.

FIG. 10 is a view showing the spectral transmittance characteristics of red color filters used for the conventional transmission type liquid crystal display device (curve 61) and for the conventional reflection type liquid crystal display device (curve 62).

DESCRIPTION OF THE PREFERRED EMBODIMENTS

Hereinbelow, the present invention will be described by way of example with reference to the accompanying drawings.

EXAMPLE 1

Figure 6:
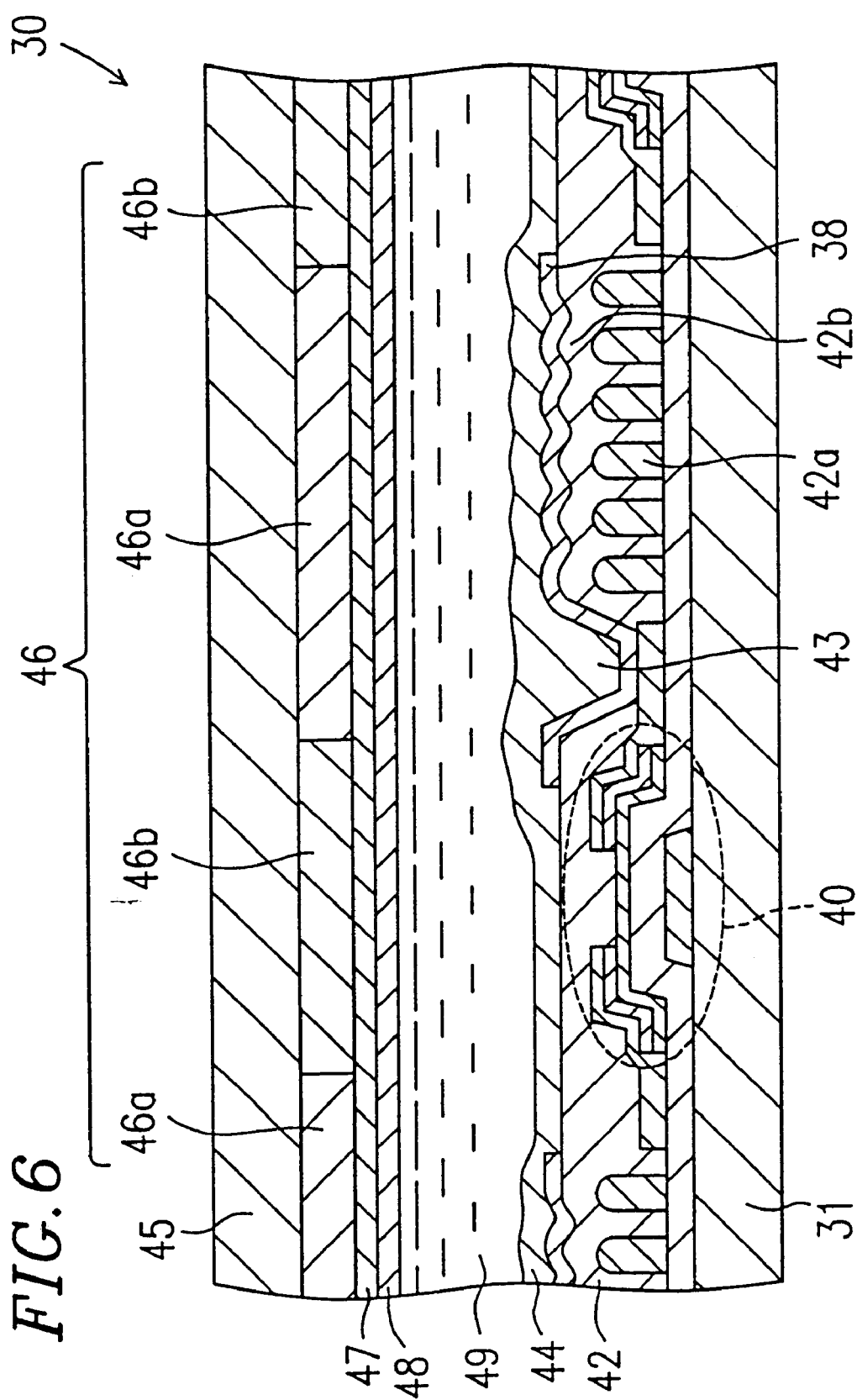
FIG. 6 is a sectional view of the embodiment of the reflection type liquid crystal display device according to the present invention.

FIG. 6 is a sectional view of a reflection type liquid crystal display device 30 of Example 1 according to the present invention. TFTs 40 are formed on a substrate 31 by a known technique. Concave and convex shaped organic insulating films 42a and 42b are also formed on the substrate 31, and reflection electrodes 38 are formed so as to be electrically connected with the respective TFTs 40 via contact holes 43. An alignment film 44 is formed over the resultant substrate 31.

A color filter 46 is formed on a counter substrate 45. The color filter 46 is composed of red, green, and blue color filters 46a located at positions corresponding to the reflection electrodes 38 on the substrate 31, and black filters 46b located at the remaining positions which do not correspond to the reflection electrodes 38. A protection film (not shown) is formed over the entire surface of the color filter 46. A transparent electrode 47 made of ITO or the like with a thickness of 150 nm and then an alignment film 48 are formed over the protection film.

The substrate 31 and the counter substrate 45 with the above configurations are attached together so that each of the red, green, and blue color filters 46a is aligned with one of the reflection electrodes 38.

A liquid crystal layer 49 is made of guest-host liquid crystal (ZLI-2327 by Merck & Co., Inc.) containing a black pigment with 4.5% of an optical active substance (S811 by Merck & Co., Inc.) mixed therein, for example. In this example, a liquid crystal material having electrooptic characteristics as shown in FIG. 7 was used to form the liquid crystal layer 49.

It is desirable that the liquid crystal layer 49 ideally has optical characteristics which provide a lower reflectance in the dark state and a higher reflectance in the bright state. In particular, a high contrast is obtained when the reflectance in the dark state is 15% or less, allowing for a color display with a high chroma. When the reflectance in the bright state is 40% or more, color filters of the three colors can be used.

Although the guest-host liquid crystal was used in this example, other types of liquid crystal requiring polarizing plates, such as TN and STN types, may also be used if the reflectances in the dark and bright states described above are obtained.

Hereinbelow, the configuration of the color filter 46 will be described. As described above, the color filter 46 is composed of the red, green, and blue color filters 46a forming color pixels and the black filters 46b forming light-shading portions.

Figure 1:
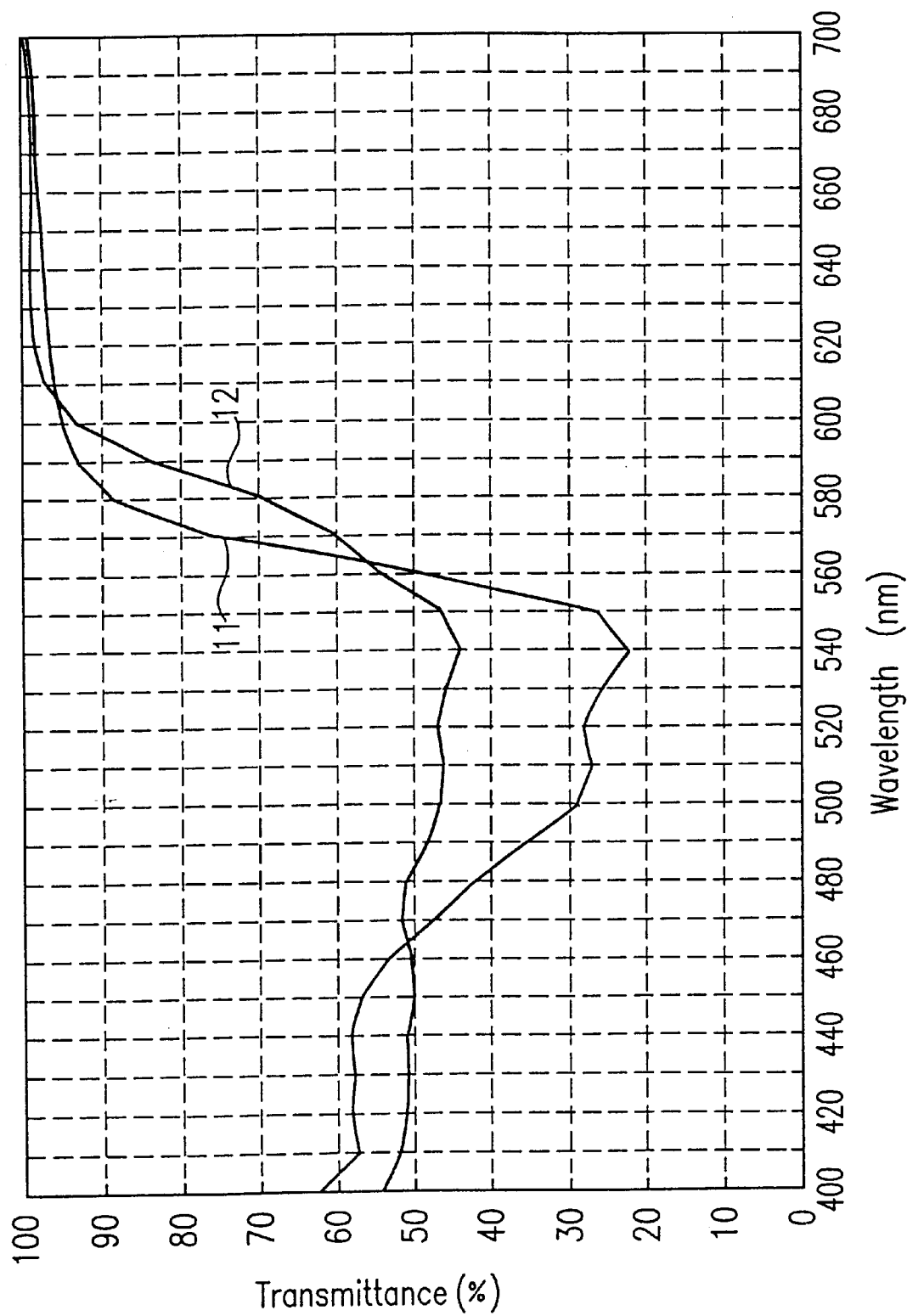
FIG. 1 is a view showing the spectral transmittance characteristics of a red color filter used for a reflection type liquid crystal display device according to the present invention (curve 11) and the spectrum transmittance characteristics of a red color filter used for the conventional reflection type liquid crystal display device (curve 12).

FIG. 1 shows the spectral transmittance characteristics of the red color filter used in this example represented by a curve 11, and the spectral transmittance characteristics of the red color filter used in the conventional reflection type liquid crystal display device represented by a curve 12. As is observed from FIG. 1, the transmittance of the red color filter in this example for light in the green wavelength range is suppressed, while that for light in the blue wavelength range is made high, compared with those of the conventional red color filter. The spectral transmittance characteristics represented by the curve 12 can be expressed as (0.392, 0.301) in the chromaticity coordinates (x, y). The spectral transmittances of the color filters were measured by a micro color analyzer (manufactured by Otsuka Electronics Co., Ltd.) under the condition of a 2° field of view using a $D_{65}$ light source. The values presented herein as the transmittances are percentages obtained when the light transmittance of 7059 glass (manufactured by Corning Inc.) is assumed to be 100%.

The $D_{65}$ light source and the 2° field of view mentioned above will be described.

Figure 9A:
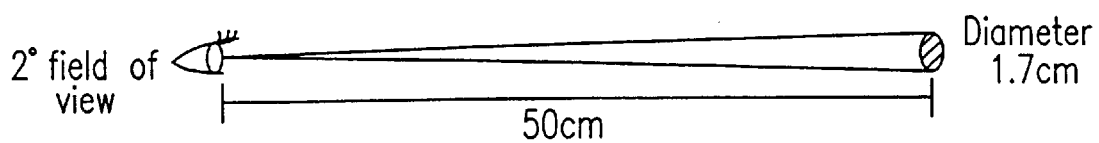
FIGS. 9A and 9B are views illustrating a 2° field of view and a 10° field of view, respectively.
Figure 9B:
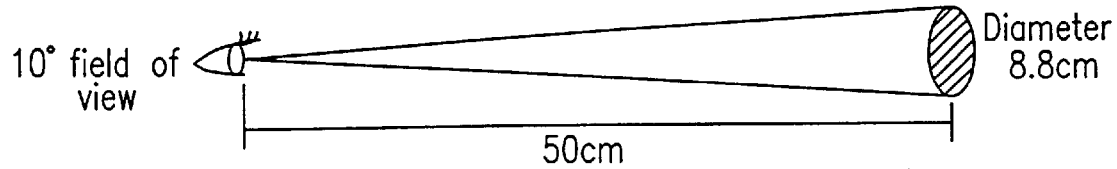

The $D_{65}$ light source is a light source which emits light identical to sunlight and is used for the measurement of an object color. The $D_{65}$ light has wavelength components as shown in FIG. 8 and is the reference light in CIE and ISO. The 2° field of view refers to a sense obtained when the human eyes recognize an object at an angle of visibility of 1° to 4° as shown in FIG. 9A. As shown in FIG. 9B, the sense obtained when the human eyes recognize an object at an angle of visibility greater than 4° is referred to as a 10° field of view. These were established to standardize the human sense for color.

The brightness of the display screen and the red visibility were examined by applying a voltage to the reflection electrode corresponding to the red color filter. The light transmittance of the red color filter used for the reflection type liquid crystal display device of this example is made low for the green wavelength range and high for the blue wavelength range, as represented by the curve 11 in FIG. 1. This prevents the color hue from changing to orange and allows for the reproduction of a red color with a good visibility. Since the reduction of the light transmittance for the green wavelength range is compensated by increasing the light transmittance for the blue wavelength range, the reduction of the overall light transmittance and thus the reduction of the brightness are prevented. Thus, a bright display is realized.

Figure 2:
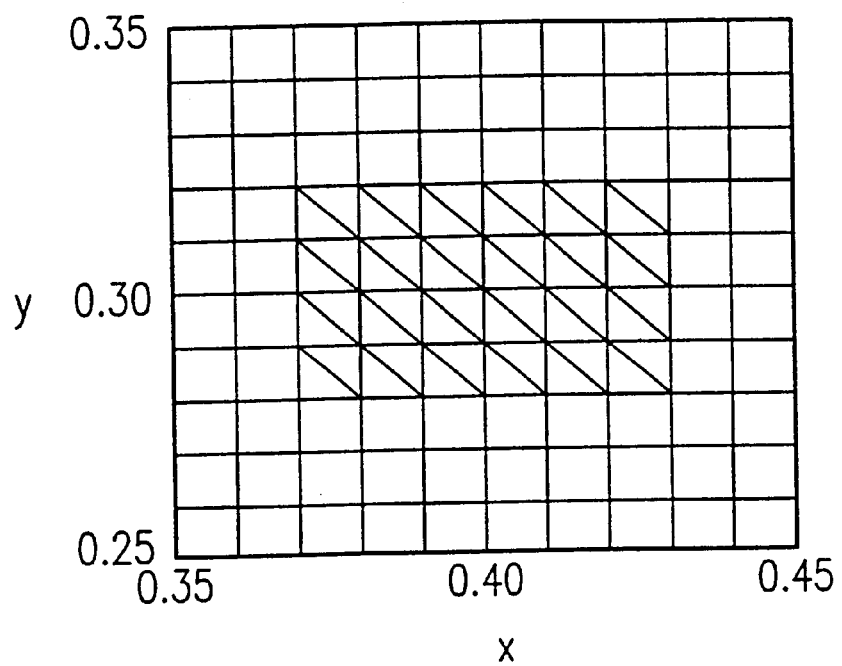
FIG. 2 is a view showing the chromaticity coordinates for a red color filter used for an embodiment of the reflection type liquid crystal display device according to the present invention.

As described above, in order to obtain a bright red color with a good visibility, the red color filter should transmit light in the range defined by the slant lines in FIG. 2 which is an XYZ color system chromaticity diagram. In other words, the red color filter should transmit light satisfying expressions $0.37 \leq x \leq 0.43$ and $0.28 \leq y \leq 0.32$.

If x is below the above range, the display color becomes pale and blurred. On the contrary, if x exceeds the above range, a vivid red color can be displayed, but the display becomes dark. This is not suitable for the reflection type liquid crystal display device.

If y is outside the above range, the color tone balance is lost. This is not suitable for full-color display. Especially, if y exceeds the above range, the color hue changes to orange, and this change is prominently recognized, resulting in the reduction of the visibility.

The red color filter can provide a sufficient brightness if the value of y at the reflection among three stimulated values in the XYZ color system is in the range of 40 to 65 inclusive.

EXAMPLE 2

A reflection type liquid crystal display device of Example 2 has substantially the same configuration as that described in Example 1. In this example, using the red color filter used in Example 1, the spectral characteristics of the green and blue color filters were set so that the chromaticity coordinates (x, y) in the XYZ color system of the white color obtained by the additive color mixture among the three colors are within the range shown by the slant lines in FIG. 5, i.e., satisfy expressions 0.28≦x≦0.31 and 0.29≦y≦0.33. Moreover, a sufficient brightness can be obtained if the value of y among the three stimulated values in the XYZ color system is in the range of 50 to 70 inclusive.

It is known that, since a color filter used for a liquid crystal display device includes a transparent conductive film made of ITO or the like, a protection film, and the like formed in layers, the white color hue especially is subject to a change due to the interference of these thin films. Accordingly, although the theoretical white point in the XYZ color system is considered to be (0.313, 0.329), the white color should be set within the ranges shown by the slant lines in FIG. 5 to compensate in advance the change in color hue. In this way, a good white color free from color staining when applied to the color filter can be reproduced.

Figure 3:
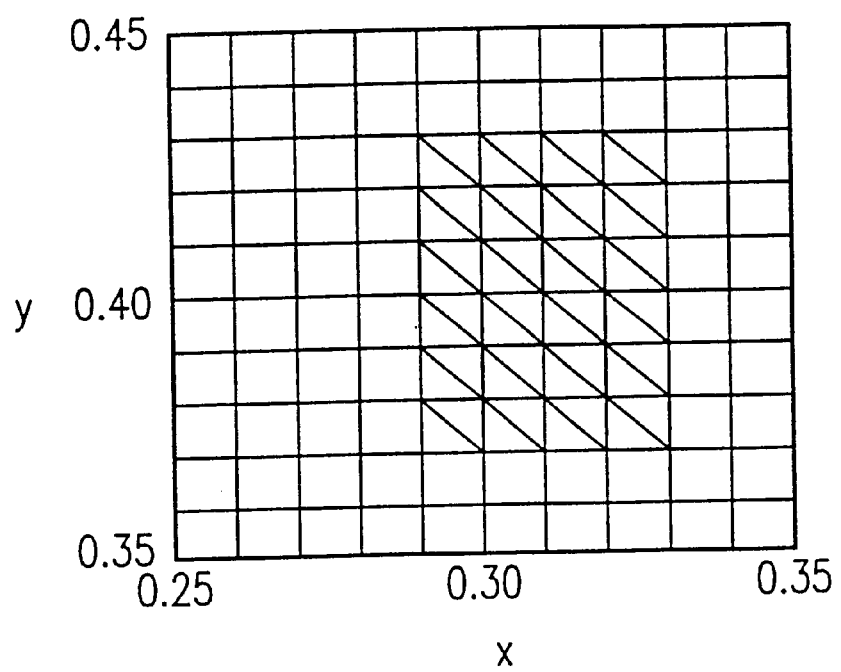
FIG. 3 is a view showing the chromaticity coordinates for a green color filter used for the embodiment of the reflection type liquid crystal display device according to the present invention.

In this example, the green color filter was set to transmit the light of which chromaticity coordinates (x, y) in the XYZ color system are within the range shown by the slant lines in FIG. 3, i.e., satisfy expressions 0.29≦x≦0.33 and 0.37≦y≦0.43. Likewise, the blue color filter was set to transmit the light of which chromaticity coordinates (x, y) in the XYZ color system are within the range shown by the slant lines in FIG. 4, i.e., satisfy expressions 0.17≦x≦0.22 and x+0.04≦y≦x+0.08. By this setting, when a white color is displayed with the entire screen being lighted, a good white color free from color staining was reproduced. Bright green and blue colors with good visibility were also reproduced.

In the green color filter, if x is below the slant-lined range shown in FIG. 3, the color hue changes to cyan. If x exceeds the range, the color hue changes to yellowish green. Also, if y is below this range, the display color becomes pale and blurred. If y exceeds the range, a vivid green color is displayed, but the display becomes dark. This is not suitable for the reflection type liquid crystal display device.

Figure 4:
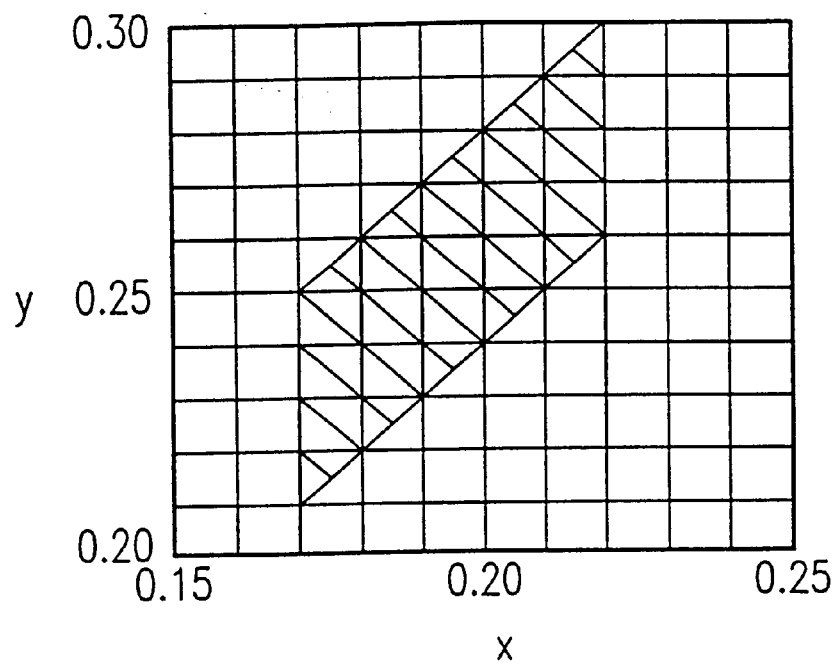
FIG. 4 is a view showing the chromaticity coordinates for a blue color filter used for the embodiment of the reflection type liquid crystal display device according to the present invention.

In the blue color filter, if x is below the slant-lined range shown in FIG. 4, a vivid blue color is displayed, but the display becomes dark. This is not suitable for the reflection type liquid crystal display device. If x exceeds the range, the color hue changes to cyan, and the display color becomes pale and blurred. Also, if y is below this range, the color hue changes to magenta. If y exceeds the range, the color hue changes to cyan.

In the green color filter, a sufficient brightness can be obtained if the value of y at the reflection among the three stimulated values in the XYZ color system is in the range of 75 to 90 inclusive. In the blue color filter, a sufficient brightness can be obtained if the value of y at the reflection among the three stimulated values in the XYZ color system is in the range of 35 to 60 inclusive.

EXAMPLE 3

In general, the color reproduction range of a liquid crystal display device is determined by the color purity of a color filter. As the color purity is higher, the color reproduction range becomes wider. As the color purity is higher, however, the light transmittance of the color filter becomes lower, failing to realize a bright display. In this example, therefore, the color designs of the red, green, and blue color filters 46a were performed giving priority to the brightness of the display. The configuration of the reflection type liquid crystal display device of this example is substantially the same as that in Example 1.

When the transmittance is increased while some degree of the chroma is sustained, the colors such as green, yellow, and cyan which include many wavelength ranges with a high luminous efficacy exhibit the poorest contrast with the white color when they are displayed, and thus are most difficult to be recognized. For this reason, the color design of the green color filter needs to be performed first, followed by the color designs of the red and blue color filters based on the green color filter.

Three green color filters Ag, Bg, and Cg were prepared as color filters with a high transmittance. The chromaticity coordinates for the green color filters Ag, Bg, and Cg are (0.309, 0.366), (0.310, 0.354), and (0.311, 0.341), respectively. These color filters were actually applied to the reflection type liquid crystal device, and the green color was displayed. As a result, a practically acceptable display was obtained for the green color filters Ag and Bg. However, the green color filter Cg was too low in contrast to show recognizable letters and diagrams of the display, and thus was found unsuitable for use in a display device.

From the above, it is found that a bright display can be obtained without reducing the green visibility when the y coordinate of the chromaticity coordinates (x, y) in the XYZ color system chromaticity diagram is within the range of 0.35≦y≦0.37. If the y coordinate exceeds 0.37, the display brightness reduces. Also, the x coordinate for the green color filter is desirably within the range of 0.29≦x≦0.33. If the x coordinate is below 0.29, the color hue becomes bluish. If it exceeds 0.33, the color hue becomes yellowish.

Figure 11:
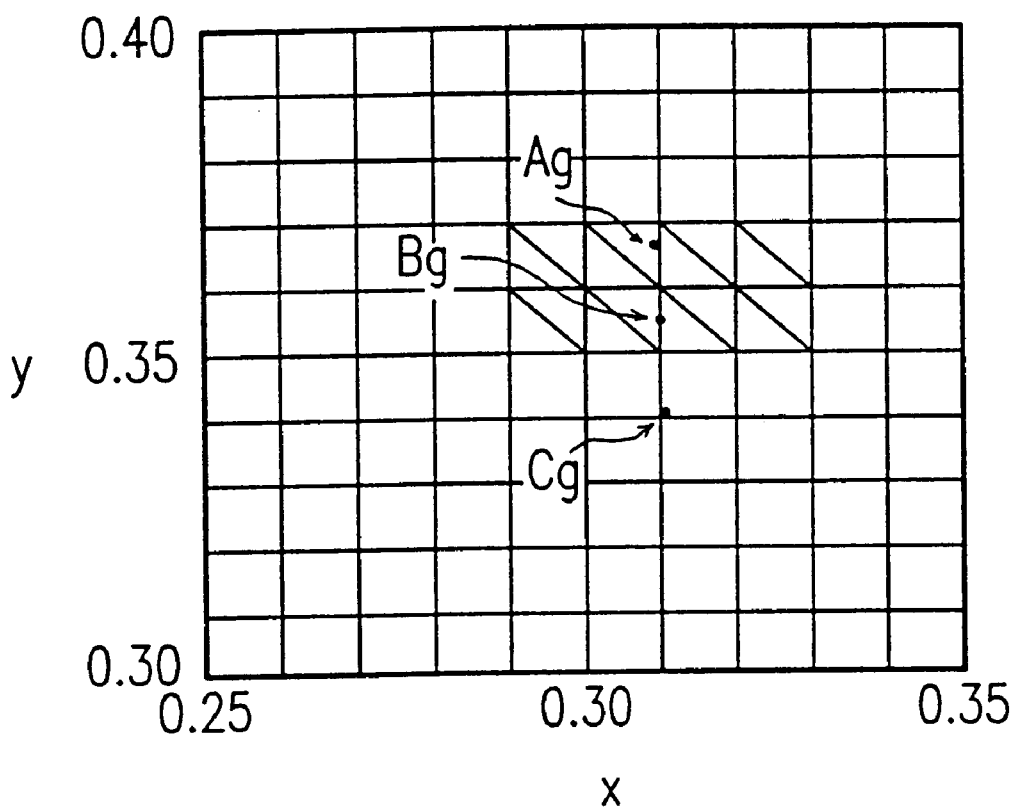
FIG. 11, is a view showing the chromaticity coordinates for a green color filter used for another embodiment of the reflection type liquid crystal display device according to the present invention.

FIG. 11 shows the range of chromaticity coordinates applicable for the green color filter, together with the chromaticity coordinates for the three green color filters Ag, Bg, and Cg described above.

As described above, once the chromaticity coordinates for the green color filter is optimized, the chromaticity coordinates for the red and blue color filters can also be optimized based on the chromaticity coordinates of the green color filter.

Figure 12:
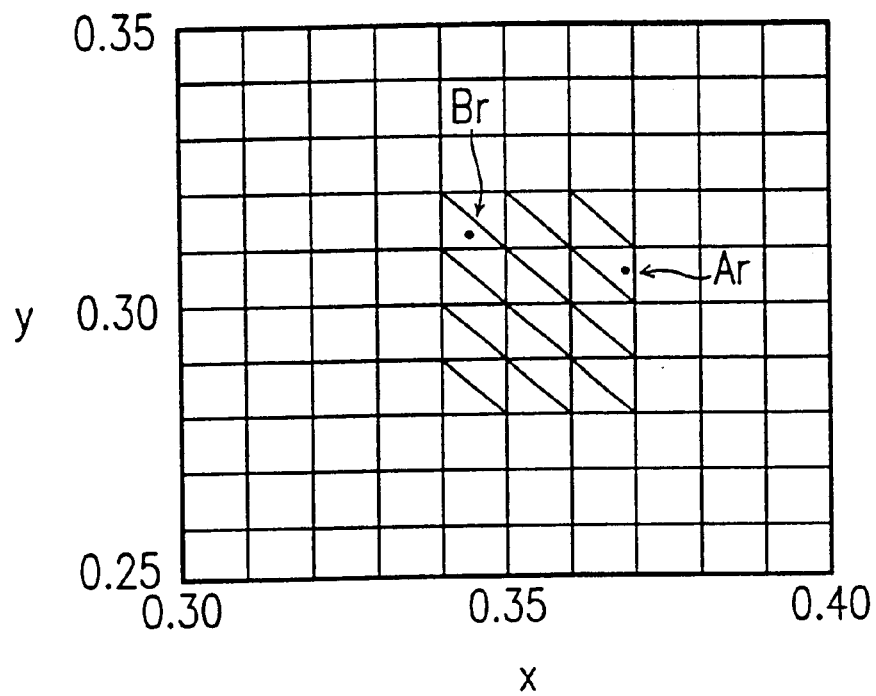
FIG. 12 is a view showing the chromaticity coordinates for a red color filter used for the embodiment of the reflection type liquid crystal display device according to the present invention.

The color design of the red color filter is desirably performed so that the visibility of yellow obtained by the additive color mixture between red and green will not be reduced. FIG. 12 shows the range of the chromaticity coordinates for the red color filter optimized based on the range for the green color filter shown in FIG. 11.

Figure 13:
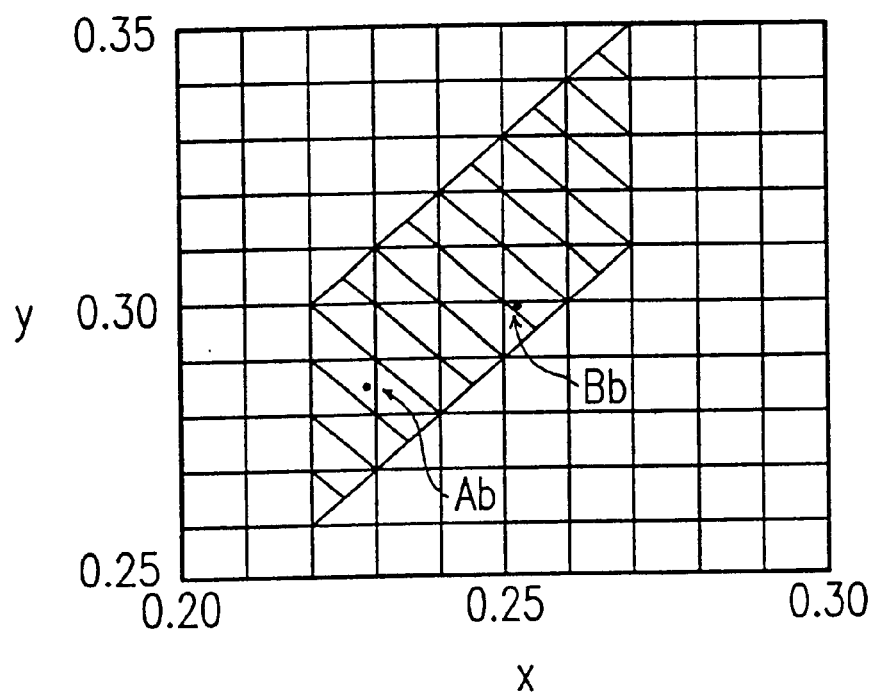
FIG. 13 is a view showing the chromaticity coordinates for a blue color filter used for the embodiment of the reflection type liquid crystal display device according to the present invention.

The color design of the blue color filter is desirably performed so that the visibility of cyan obtained by the additive color mixture between blue and green will not be reduced. FIG. 13 shows the range of the chromaticity coordinates for the blue color filter optimized based on the ranges for the green and red color filters shown in FIGS. 11 and 12, respectively.

When the above-described three color filters are combined to realize a display, the white color obtained by the additive color mixture among these colors is preferably pure white free from color staining if possible. To achieve this, the three color filters are preferably combined so that the chromaticity coordinates (x, y) in the XYZ color system of the white color obtained by the additive color mixture among these colors are within the region defined in FIG. 5, i.e., satisfy expressions 0.28≦x≦0.31 and 0.29≦y≦0.33.

In general, the theoretical white point in the XYZ color system is recognized as (0.313, 0.329) under the $D_{65}$ light source. However, it is known that, since a color filter used for a liquid crystal display includes a transparent conductive film made of ITO or the like, a protection film, and the like formed in layers, the white color hue especially is subject to a change due to the interference of these thin films. Accordingly, the white color should be set within the slant-lined range in FIG. 5 to compensate in advance the change in the color hue. In this way, a good white color free from color staining when applied to the color filter can be reproduced.

In consideration of the above, red color filters Ar and Br and blue color filters Ab and Bb were selected in the ranges of the chromaticity coordinates for the red and blue color filters shown in FIGS. 12 and 13, respectively, so as to match with the green color filters Ag and Bg described above. The reflection type liquid crystal display device using the three color filters Ar, Ag, and Ab, and the reflection type liquid crystal display device using the three color filters Br, Bg, and Bb were fabricated, and characters, diagrams, and the like were actually displayed. As a result, in both cases, a white color free from color staining was obtained, and a bright display with a practically acceptable visibility was obtained.

The chromaticity coordinates for the red color filters Ar and Br are (0.368, 0.306) and (0.344, 0.313), respectively. The chromaticity coordinates for the blue color filters Ab and Bb are (0.228, 0.284) and (0.252, 0.299), respectively. These chromaticity coordinates are shown in FIGS. 12 and 13.

In this example, the chromaticity coordinates were measured under the 2° field of view using the $D_{65}$ light source.

Thus, a very bright display can be obtained by using the color filters designed as described above for the reflection type liquid crystal display device which gives priority to the brightness of the display over the chroma (color purity) and mainly display characters, diagrams, and the like, such as a portable personal computer, a wordprocessor, and a game machine.

EXAMPLE 4

Figure 14:
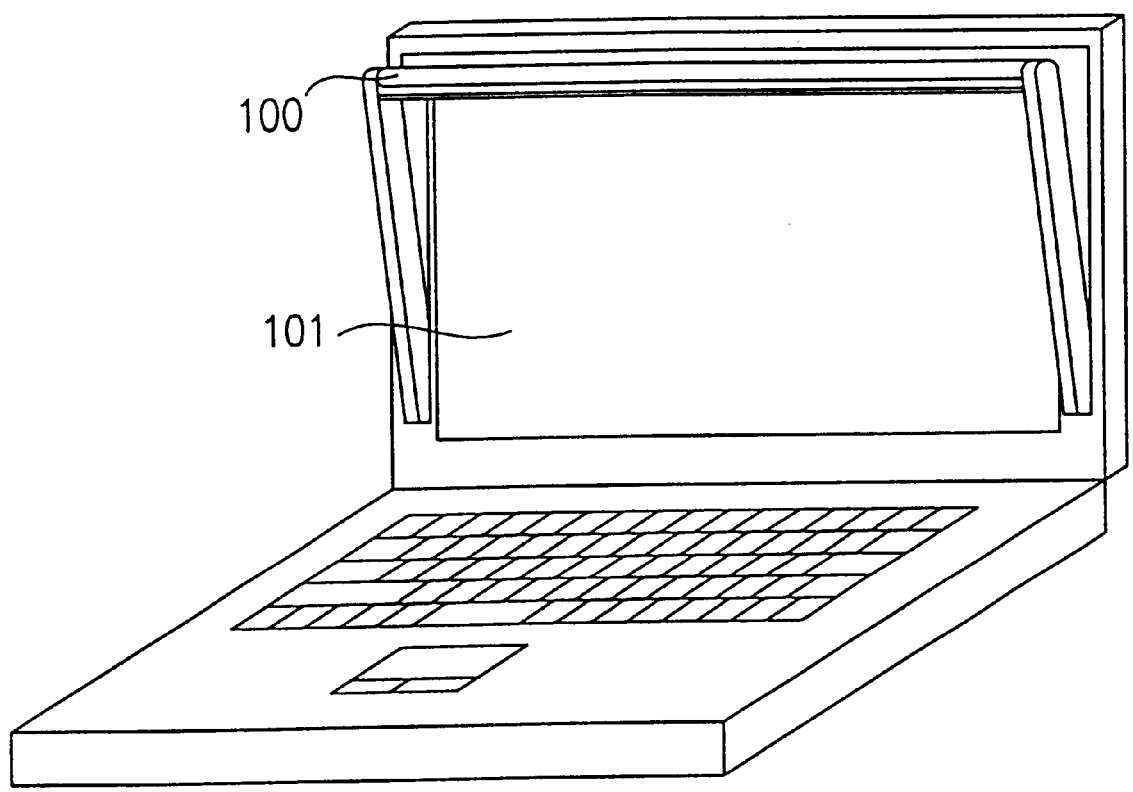
FIG. 14 is a perspective view of yet another embodiment of the reflection type liquid crystal display device according to the present invention.

In Example 4, as shown in FIG. 14, a front light 100 is provided as an auxiliary light for a reflection type liquid crystal display device which otherwise has the substantially the same configuration as that of Example 1. The front light 100 supplies light to the display surface of a display panel 101 as required to supplement the brightness of ambient light so that a bright display can be obtained even under the environment where the amount of ambient light is reduced. Accordingly, the front light 100 is not lighted under the environment where ambient light is prevalent, for example, when the illuminance is 5000 lx or more, but it is lighted under the environment where the amount of ambient light is reduced, for example, when the illuminance is below 5000 lx.

In general, the brightness of the liquid crystal display device is determined by the color purity of the color filter. As the color purity is lower, brighter display is possible. As the color purity is lower, however, the display color becomes less vivid and the color reproduction becomes lower. In this example, in order to solve this problem, the red, green, and blue color filters 46*a* are designed so that the brightness is secured and the chroma is improved even under the environment of reduced ambient light with the illuminance not reaching 5000 lx by lighting the auxiliary light.

Five types of red color filters Ar, Br, Cr, Dr, and Er as shown in Table 1 of which color purities were made lower than the red color filters used for the conventional transmission type liquid crystal display device were prepared.

Among these five color filters shown in Table 1, the color filter Ar has the highest transmittance and the color filter Er has the highest chroma.

TABLE 1

| Red Color Filters | |
|---|---|
| | Chromaticity coordinates (x, y) |
| Ar | (0.430, 0.301) |
| Br | (0.465, 0.305) |
| Cr | (0.496, 0.312) |
| Dr | (0.523, 0.320) |
| Er | (0.626, 0.351) |

The above five color filters were used in the reflection type liquid crystal display device provided with the auxiliary light as shown in FIG. 14, and the display colors were evaluated. As a result, for the color filters Ar, Br, Cr, and Dr, a sufficient brightness was obtained even under the environment of reduced ambient light by lighting the auxiliary light. However, the color filter Er had a dark display and thus was found unsuitable for the use in a display device.

When the color filters Ar, Br, Cr, and Dr were used, a sufficient brightness was secured without lighting the auxiliary light under the environment of prevalent ambient light with a luminance of 5000 lx or more, such as outdoors and near a window indoors. Accordingly, since the auxiliary light is not required under the environment of prevalent ambient light, the power consumption can be reduced.

The relationship between the chromaticity coordinates (x, y) in the XYZ color system chromaticity diagram for the red color filters and the brightness of display was examined in detail. As a result, the following were found. The display becomes dark when the x coordinate exceeds 0.55, which is not suitable for a display device. On the contrary, when the x coordinate is below 0.43, the chroma reduces and a vivid display is not obtained. Accordingly, the x coordinate of the chromaticity coordinates (x, y) for the red color filter is desirably in the range of $0.43 \leq x \leq 0.55$.

The relationship between the chromaticity coordinates (x, y) in the XYZ color system chromaticity diagram for the red color filters and the hue of the display color was also examined, and the following were found. The display color becomes purplish when the y coordinate is below 0.28, and it becomes yellowish when the y coordinate exceeds 0.32. Accordingly, the y coordinate of the chromaticity coordinates (x, y) for the red color filter is desirably in the range of $0.28 \leq y \leq 0.32$.

Likewise, five types of green color filters Ag, Bg, Cg, Dg, and Eg as shown in Table 2 below were prepared. The color purities of these color filters were made lower than the green color filters used in the conventional transmission type liquid crystal display device. These five color filters were used in the reflection type liquid crystal display device provided with-the auxiliary light as shown in FIG. 14, and the display colors were evaluated. As a result, for the color filters Ag, Bg, Cg, and Dg, a sufficient brightness was secured even under the environment of reduced ambient light by lighting the auxiliary light. However, the color filter Eg had a dark display and thus was found unsuitable for the use in a display device.

Among these five color filters shown in Table 2, the color filter Ag has the highest transmittance and the color filter Eg has the highest chroma, as in the case of the red color filters.

TABLE 2

Green Color Filters

| | Chromaticity coordinates (x, y) |
|---|---|
| Ag | (0.305, 0.431) |
| Bg | (0.303, 0.449) |
| Cg | (0.302, 0.475) |
| Dg | (0.301, 0.500) |
| Eg | (0.291, 0.622) |

When the color filters Ag, Bg, Cg, and Dg were used, a sufficient brightness was secured without lighting the auxiliary light under the environment of prevalent ambient light with a luminance of 5000 lx or more, such as outdoors and near a window indoors. Accordingly, since the auxiliary light is not required under the environment of prevalent ambient light, the power consumption can be reduced.

The relationship between the chromaticity coordinates (x, y) in the XYZ color system chromaticity diagram for the green color filters and the brightness of display was examined in detail. As a result, the following were found. The display becomes dark when the y coordinate exceeds 0.52, which is not suitable for a display device. When the y coordinate is below 0.43, the chroma reduces and a vivid display is not obtained. Accordingly, the y coordinate of the chromaticity coordinates (x, y) for the green color filter is desirably in the range of $0.43 \leq y \leq 0.52$.

The relationship between the chromaticity coordinates (x, y) in the XYZ color system chromaticity diagram for -the green color filters and the hue of the display color was also examined, and the following were found. The display color becomes bluish when the x coordinate is below 0.29, and it becomes yellowish when the x coordinate exceeds 0.33. Accordingly, the x coordinate of the chromaticity coordinates (x, y) of the green color filter is desirably in the range of $0.29 \leq x \leq 0.33$.

Likewise, five types of blue color filters Ab, Bb, Cb, Db, and Eb as shown in Table 3 below were prepared. The color purities of these color filters were made lower than the blue color filters used in the conventional transmission type liquid crystal display device. These five color filters were used in the reflection type liquid crystal display device provided with the auxiliary light as shown in FIG. 14, and the display colors were evaluated. As a result, for the color filters Ab, Bb, Cb, and Db, a sufficient brightness was obtained even under the environment of reduced ambient light by lighting the auxiliary light. However, the color filter Eb had a dark display and thus was found unsuitable for the use in a display device.

Among these five color filters shown in Table 3, the color filter Ab has the highest transmittance and the color filter Eb has the highest chroma, as in the case of the red color filters.

TABLE 3

Blue Color Filters

| | Chromaticity coordinates (x, y) |
|---|---|
| Ab | (0.163, 0.229) |
| Bb | (0.148, 0.208) |
| Cb | (0.139, 0.192) |

TABLE 3-continued

Blue Color Filters

| | Chromaticity coordinates (x, y) |
|---|---|
| Db | (0.134, 0.179) |
| Eb | (0.125, 0.131) |

When the color filters Ab, Bb, Cb, and Db were used, a sufficient brightness was secured without lighting the auxiliary light under the environment of prevalent ambient light with a luminance of 5000 lx or more, such as outdoors and near a window indoors. Accordingly, since the auxiliary light is not required under the environment of prevalent ambient light, the power consumption can be reduced.

The relationship between the chromaticity coordinates (x, y) in the XYZ color system chromaticity diagram for the blue color filter and the brightness of display was examined in detail. As a result, the following were found. The display becomes dark when the x coordinate is below 0.13, which is not suitable for a display device. When the x coordinate exceeds 0.17, the chroma reduces and thus a vivid display is not obtained. Accordingly, the x coordinate of the chromaticity coordinates (x, y) for the blue color filter is desirably in the range of $0.13 \leq y \leq 0.17$.

The relationship between the chromaticity coordinates (x, y) in the XYZ color system chromaticity diagram for the blue color filter and the hue of the display color was also examined, and the following were found. The display color becomes purplish when $y \leq x+0.04$, and it becomes yellowish when $y > x+0.08$. Accordingly, the y coordinate of the chromaticity coordinates (x, y) for the blue color filter is desirably in the range of $x+0.04 \leq y \leq x+0.08$.

Figure 15:
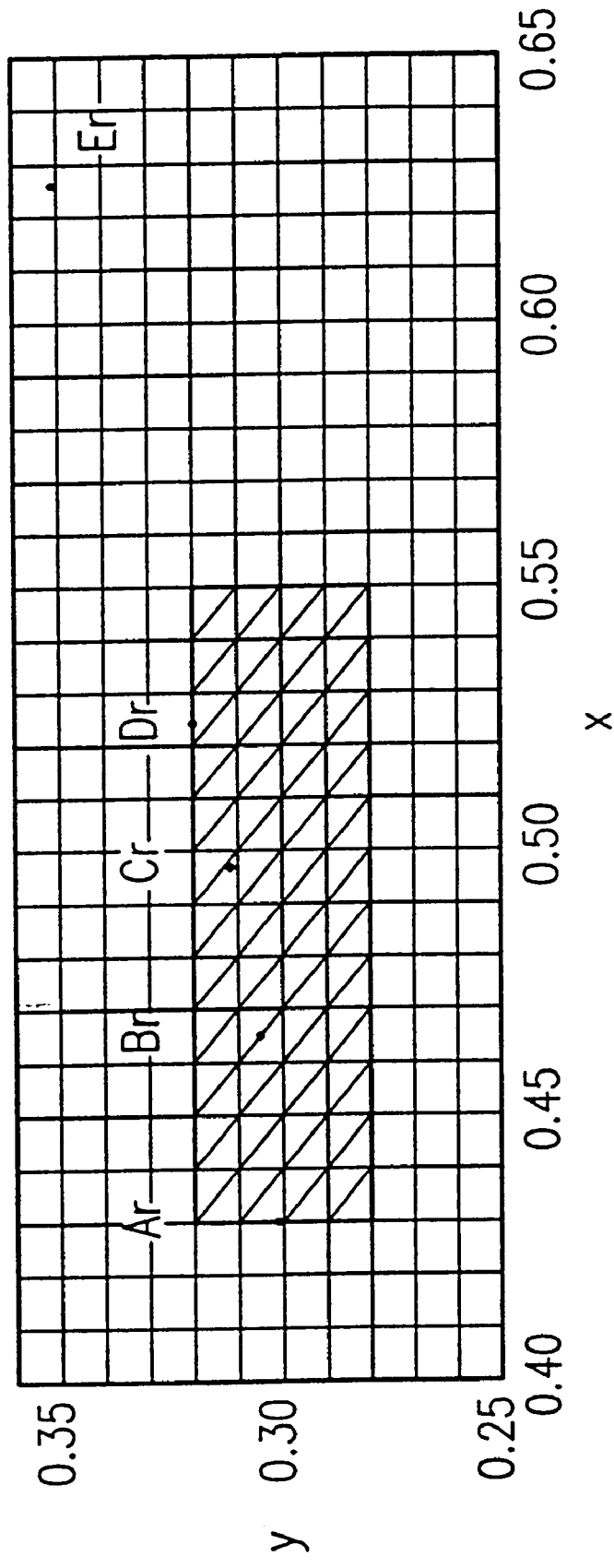
FIG. 15 is a view showing the chromaticity coordinates for a red color filter used for the embodiment of the reflection type liquid crystal display device according to the present invention.
Figure 16:
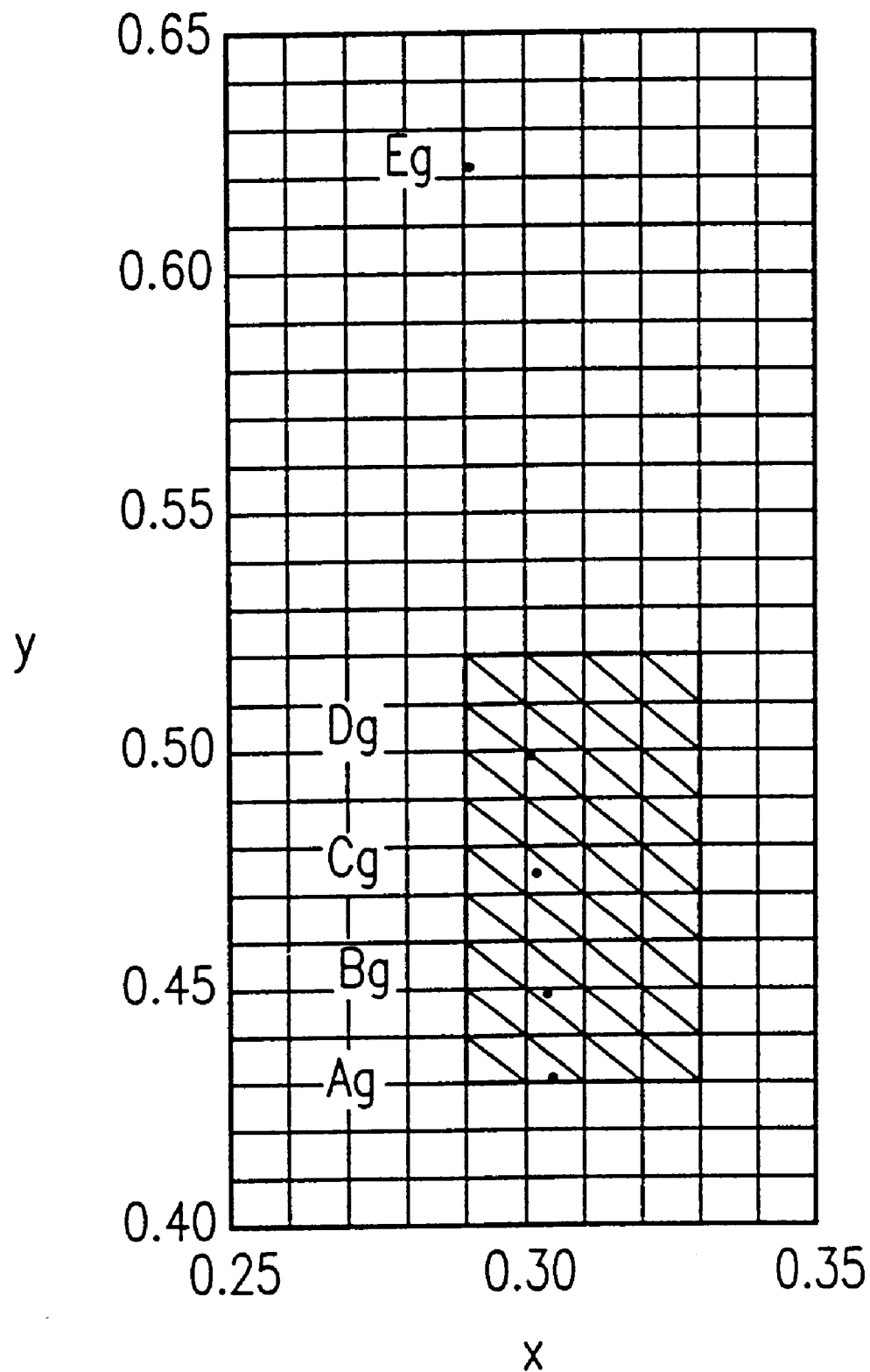
FIG. 16 is a view showing the chromaticity coordinates for a green color filter used for the embodiment of the reflection type liquid crystal display device according to the present invention.
Figure 17:
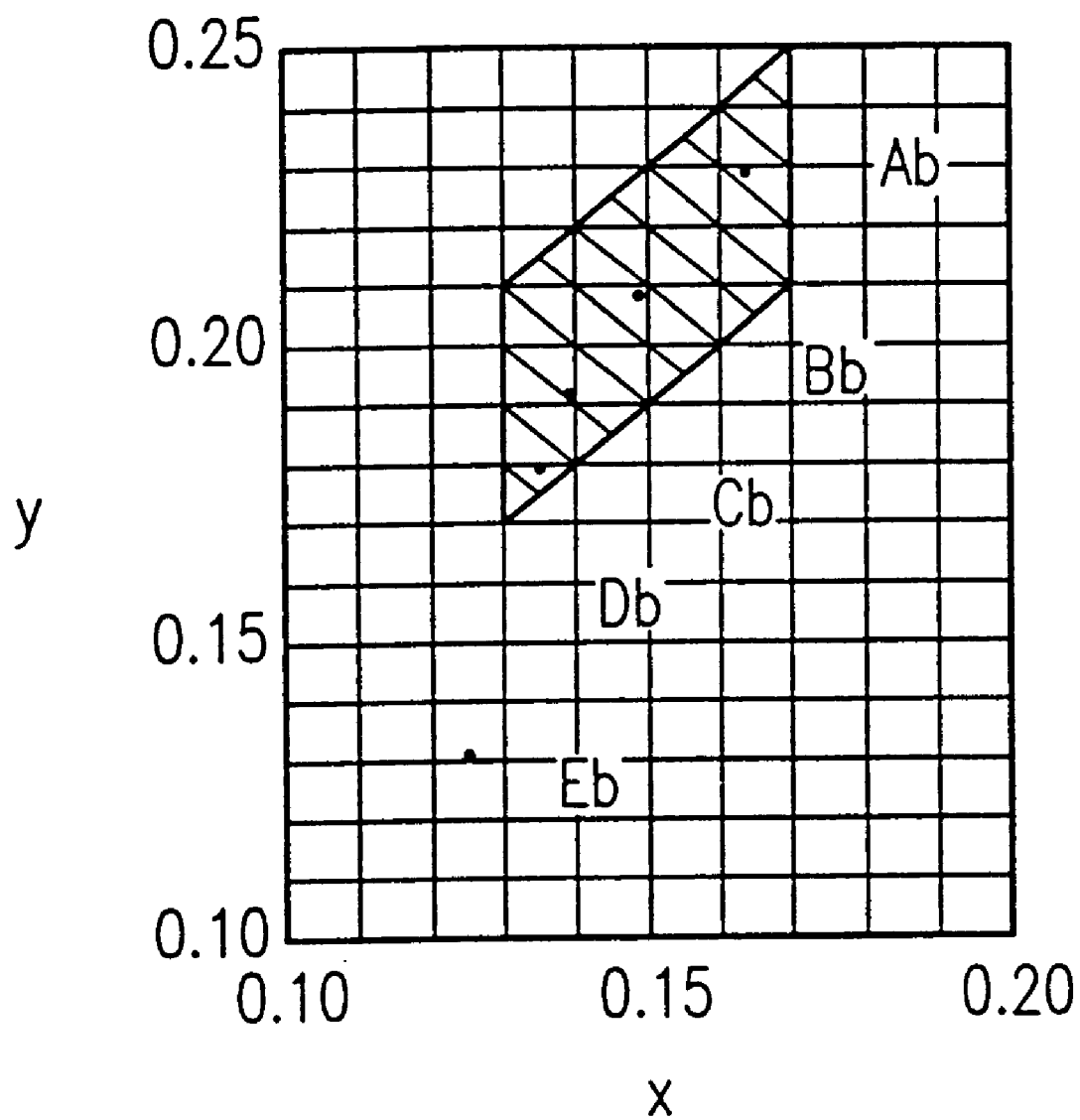
FIG. 17 is a view showing the chromaticity coordinates for a blue color filter used for the embodiment of the reflection type liquid crystal display device according to the present invention.

FIG. 15 shows the range of the chromaticity coordinates which are desirable for the red color filter as described above, as well as the chromaticity coordinates for the color filters Ar, Br, Cr, Dr, and Er. FIG. 16 shows the range of the chromaticity coordinates which are desirable for the green color filter as described above, as well as the chromaticity coordinates of the color filters Ag, Bg, Cg, Dg, and Eg. FIG. 17 shows the range of the chromaticity coordinates which are desirable for the blue color filter as described above, as well as the chromaticity coordinates of the color filters Ab, Bb, Cb, Db, and Eb.

When the color filters of the above three colors are combined to effect a display, the white color obtained by the additive color mixture among these colors should preferably be a pure white free from color staining if possible. To achieve this, the above three color filters are preferably combined so that the chromaticity coordinates (x, y) in the XYZ color system of the white color obtained by the additive color mixture among these three colors are within the range defined in FIG. 5, i.e., satisfy expressions $0.28 \leq x \leq 0.31$ and $0.29 \leq y \leq 0.33$.

In general, the theoretical white point in the XYZ color system is recognized as (0.313, 0.329) under the $D_{65}$ light source. However, it is also known that, since a color filter used for a liquid crystal display device includes a transparent conductive film made of ITO or the like, a protection film, and the like formed in layers, the white color hue especially is subject to a change due to the interference of these thin films. Accordingly, the white point should be set within the slant-lined range in FIG. 5 to compensate in advance the change in the color hue. In this way, a good white color free from color staining when applied to the color filter can be reproduced.

Figure 5:
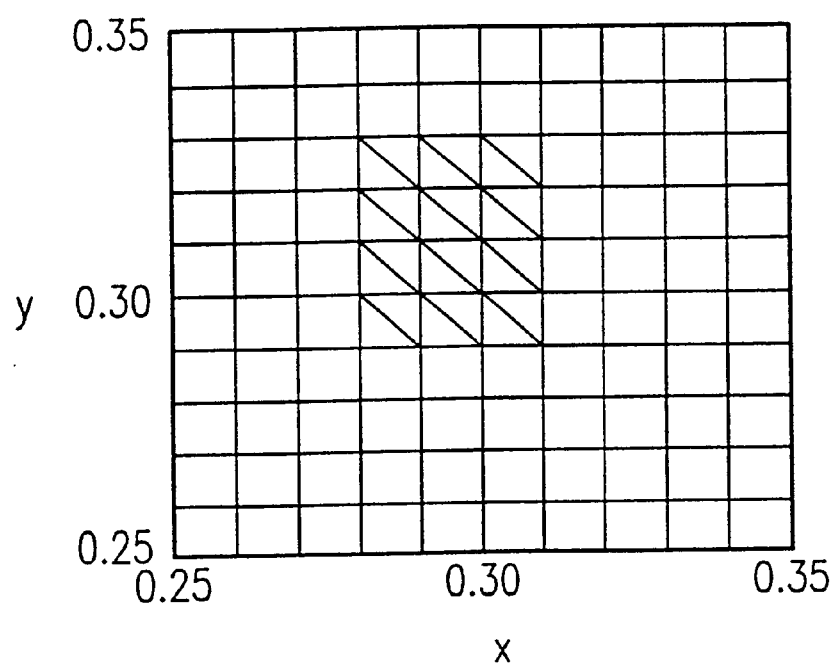
FIG. 5 is a view showing the chromaticity coordinates of a white color obtained by the additive color mixture among the color filters used for the embodiment of the reflection type liquid crystal display device according to the present invention.

A reflection type liquid crystal display device was fabricated using the red, green, and blue color filters Ar, Ag, and Ab having the respective chromaticity coordinates within the ranges shown in FIGS. 15, 16, and 17, respectively, so that the white color obtained by the additive color mixture among these colors is within the range shown in FIG. 5. The display of the resultant reflection type liquid crystal display device was tested with the auxiliary light lighted under the environment of reduced ambient light. As a result, a white color free from color staining was obtained, and a vivid display with a high chroma was realized. The display of the reflection type liquid crystal display device was also tested without lighting the auxiliary light under the environment of prevalent ambient light. As a result, as in the above case, a white color free from color staining was obtained, and a vivid display with a high chroma was realized.

Likewise, reflection type liquid crystal display devices were fabricated using the combination of the color filters Br, Bg, and Bb, the combination of the color filters Cr, Cg, and Cb, and the combination of the color filters Dr, Dg, and Db. The displays of the resultant devices were evaluated. The same results as those obtained when the color filters Ar, Ag, and Ab were combined were obtained.

In the above examples, the measurement of the chromaticity coordinates described above was performed under the 2° field of view using the $D_{65}$ light source.

Thus, by using the color filters designed as described above, a reflection type liquid crystal display device capable of providing a vivid display with a high chroma can be obtained.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A reflection type liquid crystal display device comprising:
   a pair of substrates opposing each other with a liquid crystal layer therebetween,
   a reflection electrode on one of the substrates,
   a light-transmissive counter electrode,
   color filers consisting of three colors of red, green, and blue formed on the other substrate, and
   wherein the red color filter transmits light of which chromaticity coordinates (x, y) in an XYZ color system chromaticity diagram satisfy expressions $0.37 \leq x \leq 0.43$ and $0.28 \leq y \leq 0.32$ under a condition of a 2° field of view using a $D_{65}$ light source.

2. A reflection type liquid crystal display device according to claim 1, wherein chromaticity coordinates (x, y) in the XYZ color system chromaticity diagram of a white color obtained by additive color mixture among the color filters satisfy expressions $0.28 \leq x \leq 0.31$ and $0.29 \leq y \leq 0.33$ under the condition of the 2° field of view using the $D_{65}$ light source.

3. A reflection type liquid crystal display device comprising:
   a pair of substrates opposing each other with a liquid crystal layer therebetween,
   a reflection electrode on one of the substrates,
   a light-transmissive counter electrode,
   red, green, and blue color filters on the other substrate, wherein the red color filter transmits light of which chromaticity coordinates (x, y) in an XYZ color system chromaticity diagram satisfy expressions $0.37 \leq x \leq 0.43$ and $0.28 \leq y \leq 0.32$ under a condition of a 2° field of view using a $D_{65}$ light source, and
   wherein the green color filter transmits light of which chromaticity coordinates (x, y) in the XYZ color system chromaticity diagram satisfy expressions $0.29 \leq x \leq 0.33$ and $0.37 \leq y \leq 0.43$, and the blue color filter transmits light of which chromaticity coordinates (x, y) in the XYZ color system chromaticity diagram satisfy expressions $0.17 \leq x \leq 0.22$ and $x+0.04 \leq y \leq x+0.08$, under the condition of the 2° field of view using the $D_{65}$ light source.

4. A reflection type liquid crystal display device comprising a pair of substrates opposing each other with a liquid crystal layer therebetween, a reflection electrode being formed on one of the substrates, a light-transmissive counter electrode and color filters of three colors of red, green, and blue being formed on the other substrate,
   wherein the green color filter transmits light of which chromaticity coordinates (x, y) in an XYZ color system chromaticity diagram satisfy expressions $0.29 \leq x \leq 0.33$ and $0.35 \leq y \leq 0.37$ under a condition of a 2° field of view using a $D_{65}$ light source.

5. A reflection type liquid crystal display device according to claim 4, wherein the red color filter transmits light of which chromaticity coordinates (x, y) in the XYZ color system chromaticity diagram satisfy expressions $0.34 \leq x \leq 0.37$ and $0.28 \leq y \leq 0.32$, and the blue color filter transmits light of which chromaticity coordinates (x, y) in the XYZ color system chromaticity diagram satisfy expressions $0.22 \leq x \leq 0.27$ and $x+0.04 \leq y \leq x+0.08$, under the condition of the 2° field of view using the $D_{65}$ light source.

6. A reflection type liquid crystal display device according to claim 4, wherein chromaticity coordinates (x, y) in the XYZ color system chromaticity diagram of a white color obtained by additive color mixture among the color filters of the three colors satisfy expressions $0.28 \leq x \leq 0.31$ and $0.29 \leq y \leq 0.33$ under the condition of the 2° field of view using the $D_{65}$ light source.

7. A reflection type liquid crystal display device comprising: a liquid crystal panel including a pair of substrates opposing each other with a liquid crystal layer therebetween, a reflection electrode being formed on one of the substrates, a light-transmissive counter electrode and color filters of three colors of red, green, and blue being formed on the other substrate; and an auxiliary light for supplying light to a display surface of the liquid crystal panel as required,
   wherein the red color filter transmits light of which chromaticity coordinates (x, y) in an XYZ color system chromaticity diagram satisfy expressions $0.43 \leq x \leq 0.55$ and $0.28 \leq y \leq 0.32$, the green color filter transmits light of which chromaticity coordinates (x, y) in the XYZ color system chromaticity diagram satisfy expressions $0.29 \leq x \leq 0.33$ and $0.43 \leq y \leq 0.52$, and the blue color filter transmits light of which chromaticity coordinates (x, y) in the XYZ color system chromaticity diagram satisfy expressions $0.13 \leq x \leq 0.17$ and $x+0.04 \leq y \leq x+0.08$, under a condition of a 2° field of view using a $D_{65}$ light source.

8. A reflection type liquid crystal display device according to claim 7, wherein chromaticity coordinates (x, y) in the XYZ color system chromaticity diagram of a white color obtained by additive color mixture among the color filters of the three colors satisfy expressions $0.28 \leq x \leq 0.31$ and $0.29 \leq y \leq 0.33$ under the condition of the 2° field of view using the $D_{65}$ light source.

* * * * *